(12) United States Patent
Kishimoto et al.

(10) Patent No.: US 10,487,936 B2
(45) Date of Patent: Nov. 26, 2019

(54) LUBRICATING SYSTEM FOR ENGAGEMENT MECHANISM

(71) Applicant: TOYOTA JIDOSHA KABUSHIKI KAISHA, Toyota-shi, Aichi-ken (JP)

(72) Inventors: Naoyuki Kishimoto, Susono (JP); Motoki Tabuchi, Mishima (JP); Hirotsugu Yoshino, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 329 days.

(21) Appl. No.: 15/452,064

(22) Filed: Mar. 7, 2017

(65) Prior Publication Data
US 2017/0261094 A1    Sep. 14, 2017

(30) Foreign Application Priority Data
Mar. 9, 2016    (JP) .................................. 2016-045607

(51) Int. Cl.
*F16H 57/04*    (2010.01)
*F16D 13/74*    (2006.01)
*F16D 25/08*    (2006.01)
*F16D 48/02*    (2006.01)
(Continued)

(52) U.S. Cl.
CPC ......... *F16H 57/0473* (2013.01); *F16D 13/74* (2013.01); *F16D 25/08* (2013.01); *F16D 48/02* (2013.01); *F16H 57/0435* (2013.01); *F16H 57/0446* (2013.01); *F16H 57/0484* (2013.01); *F16H 61/0021* (2013.01); *F16D 2048/029* (2013.01); *F16D 2300/06* (2013.01); *F16H 3/666* (2013.01); *F16H 2061/0037* (2013.01); *F16H 2200/006* (2013.01); *F16H 2200/0086* (2013.01); *F16H 2200/2007* (2013.01);
(Continued)

(58) Field of Classification Search
CPC ............. F16H 57/0473; F16H 57/0435; F16H 57/0446; F16H 57/0484; F16H 61/0021; F16D 13/74; F16D 25/08
See application file for complete search history.

(56) References Cited

U.S. PATENT DOCUMENTS 3,137,311 A  *  6/1964  Rohweder ........... F16D 48/0206
                                                                137/116.3
3,985,063 A  *  10/1976  Lemon .................... F16D 25/14
                                                                91/31
(Continued)

FOREIGN PATENT DOCUMENTS

JP    2012-180867 A    9/2012

*Primary Examiner* — Michael A Riegelman
(74) *Attorney, Agent, or Firm* — Hunton Andrews Kurth LLP (57) ABSTRACT

A first valve is disposed in an oil passage through which the engaging pressure generated by a linear solenoid valve is supplied to A second brake. The first valve is closed when the second brake is released, so as to close the oil passage, and is opened when the second brake is engaged, so as to open the oil passage. A second valve is disposed in a lubricating oil passage through which lubricating oil is supplied to the second brake, and communicates with the linear solenoid valve. The second valve is opened when the engaging pressure is supplied from the linear solenoid valve, so as to open the lubricating oil passage, and is closed when no engaging pressure is generated by the linear solenoid valve.

6 Claims, 9 Drawing Sheets

(51) Int. Cl.
*F16H 61/00* (2006.01)
*F16H 3/66* (2006.01)
(52) U.S. Cl.
CPC ............... *F16H 2200/2046* (2013.01); *F16H 2200/2097* (2013.01)

(56) References Cited

U.S. PATENT DOCUMENTS

| | | | | |
|---|---|---|---|---|
| 4,265,346 A | * | 5/1981 | Emmadi | F16D 25/14 137/505.13 |
| 4,696,383 A | * | 9/1987 | Aoki | F16D 25/14 192/113.36 |
| 6,615,966 B2 | * | 9/2003 | Kato | F16D 25/123 192/70.12 |
| 2004/0159523 A1 | * | 8/2004 | Duan | F16D 25/123 192/70.12 |
| 2006/0116240 A1 | * | 6/2006 | Honda | F16D 48/02 477/156 |
| 2010/0035720 A1 | * | 2/2010 | Tabuchi | F16H 61/6648 476/10 |
| 2014/0008172 A1 | | 1/2014 | Lundstrom | |
| 2015/0247570 A1 | * | 9/2015 | Nakano | F16D 25/0638 192/3.57 |
| 2015/0252894 A1 | * | 9/2015 | Nakano | F16D 63/34 192/3.57 |
| 2016/0201737 A1 | * | 7/2016 | Kawakami | F16D 48/00 192/69.8 |
| 2016/0363177 A1 | * | 12/2016 | Samie | F16D 25/044 |
| 2017/0089402 A1 | * | 3/2017 | Deakin | B60K 6/10 |
| 2017/0146075 A1 | * | 5/2017 | Lister | F16D 48/02 |
| 2017/0261094 A1 | * | 9/2017 | Kishimoto | F16D 13/74 |
| 2017/0335953 A1 | * | 11/2017 | Fukuda | F16D 48/02 |
| 2017/0335963 A1 | * | 11/2017 | Fukuda | F16D 25/062 |
| 2018/0306307 A1 | * | 10/2018 | Kishimoto | F16H 57/0473 |

* cited by examiner

|     | C1 | C2 | C3 | C4 | B1 | B2 |
|-----|----|----|----|----|----|----|
| P   | ×  | ×  | ×  | ×  | ×  | ×  |
| R1  | ×  | ×  | ○  | ×  | ×  | ○  |
| R2  | ×  | ×  | ×  | ○  | ×  | ○  |
| N   | ×  | ×  | ×  | ×  | ×  | ×  |
| 1ST | ○  | ×  | ×  | ×  | ×  | ○  |
| 2ND | ○  | ×  | ×  | ×  | ○  | ×  |
| 3RD | ○  | ×  | ○  | ×  | ×  | ×  |
| 4TH | ○  | ×  | ×  | ○  | ×  | ×  |
| 5TH | ○  | ○  | ×  | ×  | ×  | ×  |
| 6TH | ×  | ○  | ×  | ○  | ×  | ×  |
| 7TH | ×  | ○  | ○  | ×  | ×  | ×  |
| 8TH | ×  | ○  | ×  | ×  | ○  | ×  |

LUBRICATING SYSTEM FOR ENGAGEMENT MECHANISM

INCORPORATION BY REFERENCE

The disclosure of Japanese Patent Application No. 2016-045607 filed on Mar. 9, 2016 including the specification, drawings and abstract is incorporated herein by reference in its entirety.

BACKGROUND

1. Technical Field

The disclosure relates to a lubricating system for an engagement mechanism used in an automatic transmission of a vehicle, for example, and more particularly to a lubricating system for an engagement mechanism having engagement elements that transmit torque by use of frictional force, and a hydraulic part that presses the engagement elements and generates the frictional force.

2. Description of Related Art

A lubricating system that supplies lubricating oil to a frictional engagement element used in an automatic transmission of a vehicle, for example, is known (see, for example, Japanese Patent Application Publication No. 2012-180867 (JP 2012-180867 A)). The lubricating system of the automatic transmission includes a lubrication switching valve that opens and closes a lubricating oil passage, according to an engaging pressure of the frictional engagement element. The frictional engagement element includes a plurality of inner plates, and a plurality of outer plates disposed between adjacent ones of the inner plates. The inner plates and the outer plates provide friction members. The engaging pressure of the frictional engagement element is controlled through supply of the lubricating oil to a hydraulic servo. The friction members contact and engage with each other when the frictional engagement element is in an engaged state in which the engaging pressure is applied to the element, and the friction members are disengaged from each other when the frictional engagement element is in a released state in which the engaging pressure is drained. During transition between the engaged state and the released state, the friction members are in a slipping state, namely, slip relative to each other. When the friction members are in the slipping state, the lubricating oil is supplied so as to prevent seizure of the friction members. In the engaged state and the released state, the lubrication switching valve is closed, and supply of the lubricating oil is stopped.

SUMMARY

However, in the lubricating system of the automatic transmission as described above, the lubrication switching valve for opening and closing the lubricating oil passage is controlled according to the engaging pressure of the frictional engagement element. Therefore, if a system for supplying the lubricating oil falls into a failed state and the engaging pressure rises, for example, when the lubrication oil is supplied in a slipping state during a transition of the frictional engagement element between the engaged state and the released state, the frictional engaging element that is set to the released state may be engaged untimely or unexpectedly. This undesirable situation may affect shift control of the automatic transmission, for example.

This disclosure provides a lubricating system for an engagement mechanism which can prevent a problem that an engagement element that is set to a released state is engaged.

An aspect of the disclosure provides a lubricating system for supplying a lubricating oil to a frictional engagement mechanism. The frictional engagement mechanism includes engaging elements and a hydraulic part. The engaging elements are configured to transmit torque by use of frictional force. The hydraulic part configured to press the engaging elements and generate the frictional force. The lubricating system includes an engaging pressure generator, a first valve and a second valve. The is engaging pressure generator is configured to generate an engaging pressure supplied to the hydraulic part. The first valve is configured to interrupt supply of the engaging pressure to the hydraulic part when the frictional engagement mechanism is placed in a released state. The second valve is configured to operate in response to the engaging pressure, and supply the lubricating oil to the engaging elements when the frictional engagement mechanism is placed in the released state.

The first valve may be configured such that interruption of supply of the engaging pressure to the hydraulic part is cancelled when the frictional engagement mechanism is placed in an engaged state. The second valve may be configured such that the lubricating oil is supplied to the engaging elements when the frictional engagement mechanism is placed in the engaged state. With this arrangement, when the engagement elements are engaged, the supply of the lubricating oil and the reliability of the engaged state can be ensured.

The lubricating system may further include a lubricating oil passage, the lubricating oil passage may through which the lubricating oil is supplied to the engaging elements. And the second valve may be configured to open the lubricating oil passage when the engaging pressure generated by the engaging pressure generator is supplied to the second valve. With this arrangement, the configuration of the second valve can be simplified.

The lubricating system may further include an electronic control unit. The electronic control unit may be configured to control opening and closing operation of the second valve. And the electronic control unit may be configured to operate the second valve such that the lubricating oil is supplied to the engaging elements, during a predetermined time after the frictional engagement mechanism is switched from the engaged state to the released state. The frictional engagement mechanism is brought into a slipping state when it is in an intermediate state in the process of change from the engaged state to the released state, for example. Therefore, immediately after the change from the engaged state to the released state, the quantity of heat generated by the engagement mechanism becomes large. Thus, the lubricating oil is supplied to the engagement mechanism during a period of time in which the quantity of heat generated is large and cooling is required, so that a dragging loss of the engagement elements is reduced, and heat generation of the engagement elements can be prevented or curbed.

The above-indicated predetermined time may be a length of time required to make a quantity of heat generation equal to or smaller than a predetermined value. The quantity of heat generation may be estimated based on the engaging pressure supplied to the hydraulic part of the frictional engagement mechanism, and a rotational speed of the engaging elements. With this arrangement, a dragging loss of the engagement elements is reduced, and heat generation of the engagement elements can be prevented or curbed.

The lubricating system may further include an oil passage. The oil passage may through which the engaging pressure is supplied from the engaging pressure generator to the hydraulic part. The first valve may be configured to shut off the oil passage by operating according to a given signal pressure generated when the frictional engagement mechanism is placed in the released state, and open the oil passage when the given signal pressure is not generated. The predetermined signal pressure includes an engaging pressure that is generated when any of the frictional engagement mechanisms other than the above-indicated frictional engagement mechanism is placed in the engaged state. For example, if the engaging pressure generator fails and the engaging pressure rises, the frictional engagement mechanism that is set to the released state is prevented in advance from being erroneously engaged.

According to this disclosure, the first valve is provided for interrupting supply of the engaging pressure to the hydraulic part when the frictional engagement mechanism is placed in the released state. With this arrangement, even if a system that supplies the lubricating oil, for example, falls into a failed state, and the engagement pressure rises, the frictional engagement mechanism that is set to the released state can be prevented from being undesirably engaged.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
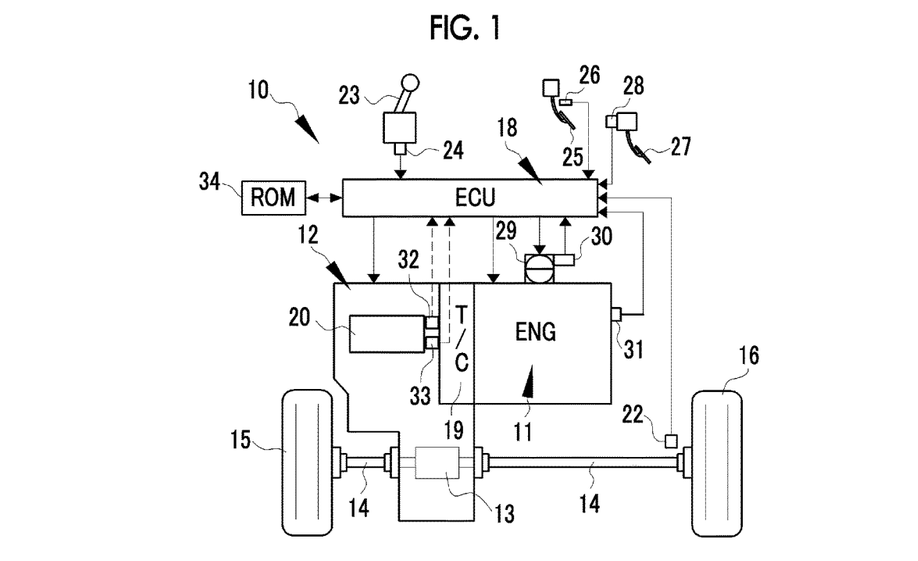
FIG. 1 is an explanatory view schematically showing one example of a vehicle to which this disclosure is applied.

FIG. 1 is an explanatory view showing one example of a vehicle to which this disclosure is applied. As shown in FIG. 1, the vehicle 10 is an FF (front-engine, front-drive) type vehicle. The vehicle to which the disclosure is applied is not limited to the FF type vehicle, but may be an FR (front-engine, rear-drive) type vehicle. The vehicle 10 includes an engine 11, automatic transmission 12, differential gear unit 13, drive axle 14, drive wheels 15, 16, and an ECU (electronic control unit) 18.

The engine 11 is one example of a driving power source, in which fuel is burned so as to generate driving force. As the driving power source, a diesel engine, a motor, or a combination of an engine and a motor, may be used, in place of the engine 11. The driving force generated by the engine 11 is transmitted to the automatic transmission 12. The automatic transmission 12 includes a torque converter 19 and a transmission 20, and changes the gear position of the transmission 20 to a target gear position, according to information on operating conditions of the vehicle 10, such as the vehicle speed and the engine load (accelerator pedal stroke). The torque converter 19 contains a working fluid, and transmits the driving force generated by the engine 11 to the transmission 20 via the working fluid. The transmission 20 is placed in a certain gear position selected from a plurality of gear positions, based on the target gear position, so as to increase or reduce the input driving force to certain driving force, and transmit it to the differential gear unit 13. The differential gear unit 13 transmits the driving force to the drive wheels 15, 16 mounted on the right and left ends of the drive axle 14.

The ECU 18 receives vehicle speed information sent by a vehicle speed sensor 22 that detects the rotational speed of the drive axle 14, position information sent by a position switch 24 included in a shift lever 23, and accelerator pedal stroke information sent by an accelerator pedal position sensor 26 included in an accelerator pedal 25, for example. The ECU 18 also receives brake information sent by a stroke sensor 28 included in a brake pedal 27, throttle opening information sent by a throttle opening sensor 30 included in an electronic throttle valve 29 of the engine 11, and engine speed information sent by an engine speed sensor 31 included in the engine 11. The ECU 18 further receives input shaft speed information sent by an input shaft speed sensor 32 included in the automatic transmission 12, and output shaft speed information sent by an output shaft speed sensor 33. The vehicle 10 may be provided with a manual mode in which the gear position of the transmission 20 is placed in a gear position selected by the driver. The ECU 18 controls operation of the engine 11 and shifting of the automatic transmission 12, based on results obtained by processing each input information, based on maps and programs stored in a ROM (Read Only Memory) 34, so that the vehicle 10 is brought into the optimum operating state.

Figure 2:
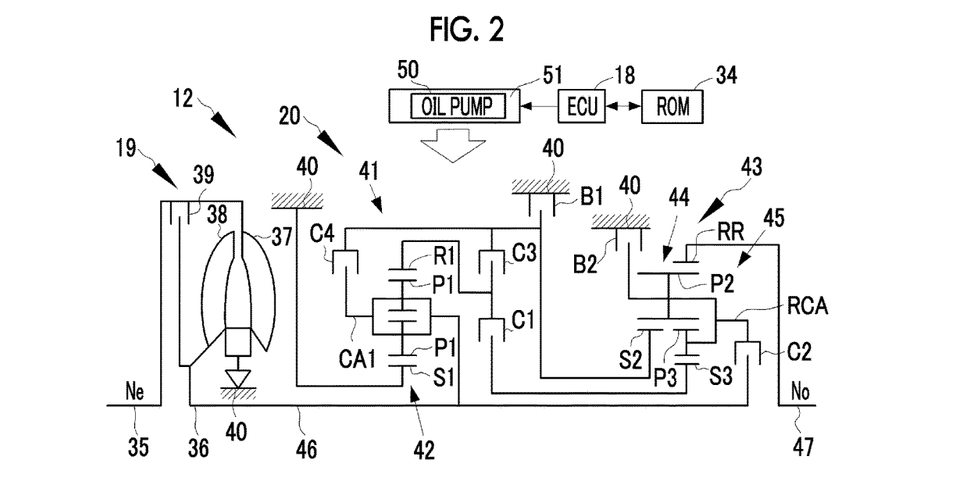
FIG. 2 is a skeleton diagram showing one example of a torque converter and a transmission.

FIG. 2 is a skeleton diagram showing one example of the torque converter 19 and the transmission 20. As shown in FIG. 2, the torque converter 19 includes an input shaft 35 that receives the driving force from the engine 11, and an output shaft 36 that delivers the driving force to the transmission 20. The torque converter 19 also includes a pump impeller 37 as an input-side rotating element, a turbine runner 38 as an output-side rotating element, and a lock-up clutch 39 that mechanically couples the pump impeller 37 with the turbine runner 38. The torque converter 19 transmits torque by converting engine torque into flow of hydraulic oil by means of the pump impeller 37, and converting the flow of the hydraulic oil into torque of the output shaft 36 by means of the turbine runner 38. The lock-up clutch 39, which has the same or similar configuration as that of a known one, is in the form of a friction clutch that operates by use of a hydraulic pressure, such that the transmission torque capacity continuously changes according to the hydraulic pressure. The lock-up clutch 39 is controlled by the ECU 18 to be changed into a released state when the vehicle 10 is at rest, and changed into an engaged state after the vehicle starts.

The transmission 20 includes a double-pinion type first planetary gear mechanism 42 that constitutes a first speed change unit 41, within a transmission case (which will be called "case") 40 as a non-rotating member attached to the vehicle body. Also, a single-pinion type second planetary gear mechanism 44 and a double-pinion type third planetary gear mechanism 45, which constitute a second speed change unit 43, are provided in the case 40. An input shaft 46 of the automatic transmission 12 is coupled to the output shaft 36 of the torque converter 19. The automatic transmission 12 increases or reduces drive torque received by the input shaft 46, using one or both of the first speed change unit 41 and the second speed change unit 43, and delivers the resulting torque to the output shaft 47.

The transmission 20 includes a first clutch C1, second clutch C2, third clutch C3, fourth clutch C4, first brake B1, and a second brake B2, as engagement mechanisms for establishing a plurality of gear positions having different gear ratios. For example, the first clutch C1, second clutch C2, third clutch C3, fourth clutch C4, first brake B1, and the second brake B2 are hydraulic, frictional engagement mechanisms, each of which is hydraulically switched between an engaged state and a released state.

The first planetary gear mechanism 42 includes a first sun gear S1, a pair of first pinion gears P1, a first carrier CA1, and a ring gear R1. The first pinion gears P1 mesh with the first sun gear S1 and the first ring gear R1. The first carrier CA1 supports the first pinion gears P1 such that the pinion gears P1 can rotate about the axis of the first planetary gear mechanism 42 and rotate about themselves. The first sun gear S1 is fixed to the case 40 so as not be able to rotate. To the first carrier CA1, the drive torque is transmitted from the output shaft 36 of the torque converter 19 via the input shaft 46.

The second speed change unit 43 is a Ravigneaux planetary gear mechanism that consists of a second planetary gear mechanism 44 and a third planetary gear mechanism 45. The second planetary gear mechanism 44 includes a second sun gear S2, second pinion gear P2, rear carrier RCA, and a rear ring gear RR. The third planetary gear mechanism 45 includes a third sun gear S3 and a third pinion gear P3. The second pinion gear P2 meshes with the second sun gear S2, rear ring gear RR, and the third pinion gear P3. The third pinion gear P3 meshes with the third sun gear S3 of the third planetary gear mechanism 45, in addition to the second pinion gear P2. The rear carrier RCA supports the second pinion gear P2 and the third pinion gear P3 of the third planetary gear mechanism 45, such that the second pinion gear P2 and the third pinion gear P3 can rotate about the axis of the second speed change unit 43 and rotate about themselves. The rear ring gear RR is coupled to the output shaft 47.

The ECU 18 transmits control signals to various solenoid valves provided in a hydraulic circuit 50 that supplies hydraulic oil, so as to control supply of hydraulic pressures (engaging pressures) to the first clutch C1, second clutch C2, third clutch C3, fourth clutch C4, first brake B1, and the second brake B2. More specifically, the hydraulic circuit 50 includes an oil pump 51 coupled to a crankshaft (not shown) of the engine 11. The oil pump 51 is driven by the crankshaft when it rotates, so as to generate hydraulic pressure through supply of the hydraulic oil and lubricating oil. The hydraulic pressure generated in the oil pump 51 is supplied to various solenoid valves (not shown). Each solenoid valve is subjected to duty control based on a control signal from the ECU 18. The lubricating oil is used for cooling friction members, such as friction plates, which will be described later in detail. The same or similar oil may be used as the hydraulic oil and the lubricating oil.

Figure 3:
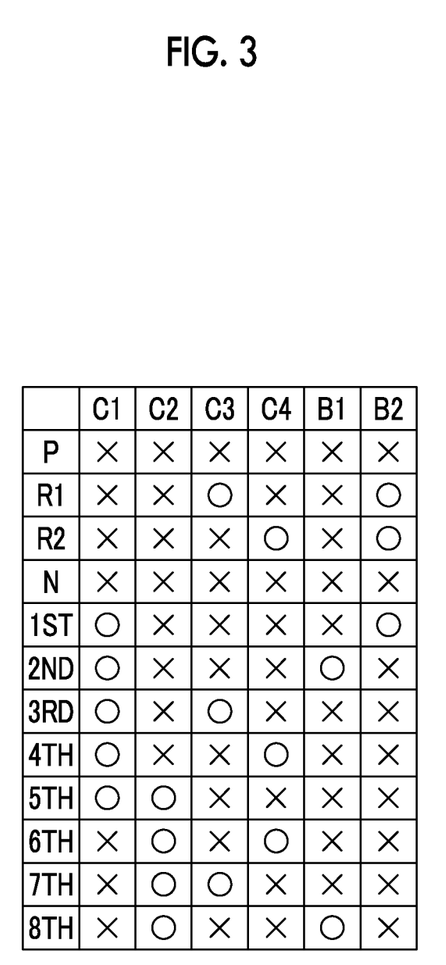
FIG. 3 is a view showing operation of frictional engagement mechanisms when a plurality of gear positions are established in the transmission.

FIG. 3 is a view showing operation of the frictional engagement mechanisms when the gear positions are established in the transmission 20. In FIG. 3, "O" denotes frictional engagement mechanism that is placed in the engaged state when the gear positions 1ST-8TH, and neutral (N) and parking (P) positions are established, and "x" denotes frictional engagement mechanism that is placed in the released state. As shown in FIG. 3, the transmission 20 establishes forward 1st-speed (1ST) through forward 8th-speed (8TH) gear positions, and reverse 1st-speed (R1) and reverse 2nd-speed (R2) gear positions, using a combination of frictional engagement mechanisms that are changed into the engaged states. The neutral (N) position and the parking (P) position can be established by changing all of the frictional engagement mechanisms to the released states. When the forward 1st-speed (1ST) gear position is established, the first clutch C1 and the second brake B2 are changed to the engaged states. When the forward 2nd-speed (2ND) through forward 8th-speed (8TH) gear positions are established, at least one of the frictional engagement mechanisms other than the second brake B2 is changed to the engaged state.

Figure 4:
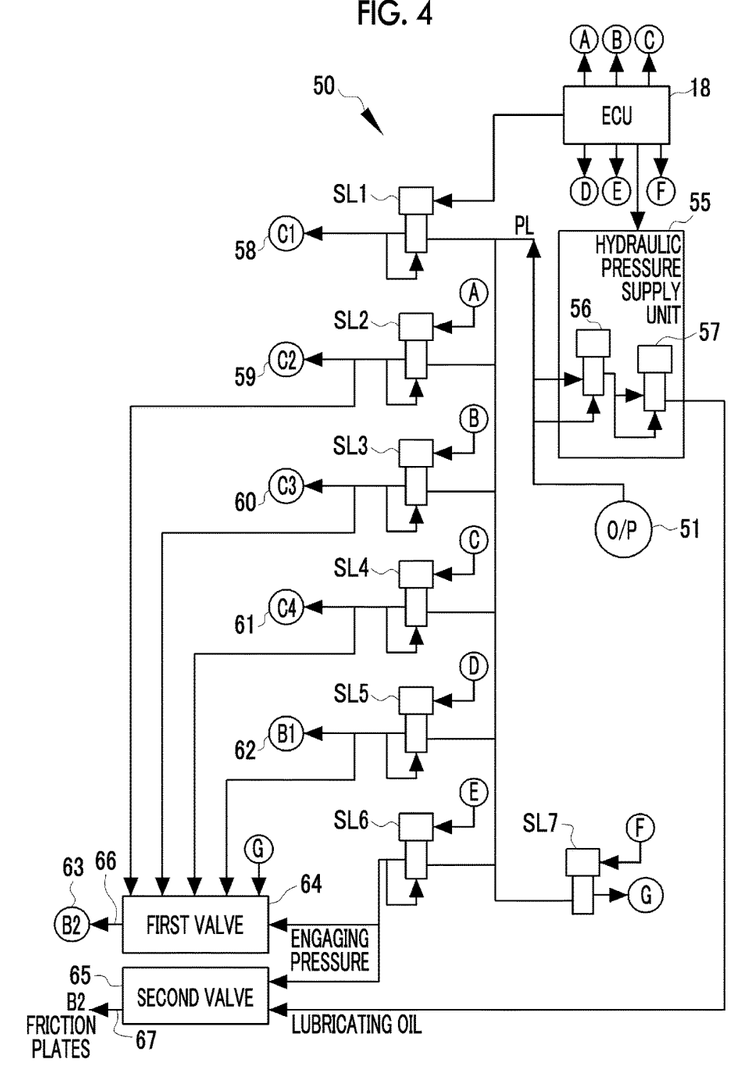
FIG. 4 is an explanatory view showing a supply unit that supplies hydraulic pressures to the frictional engagement mechanisms.

FIG. 4 is an explanatory view showing a principal part of the hydraulic circuit 50. As shown in FIG. 4, the hydraulic circuit 50 includes a hydraulic pressure supply unit 55, first linear solenoid valve SL1, second linear solenoid valve SL2, third linear solenoid valve SL3, fourth linear solenoid valve SL4, and a fifth linear solenoid valve SL5. The hydraulic circuit 50 also includes a sixth linear solenoid valve SL6, seventh solenoid valve SL7, first hydraulic servo 58, second hydraulic servo 59, third hydraulic servo 60, fourth hydraulic servo 61, fifth hydraulic servo 62, and a sixth hydraulic servo 63. The hydraulic pressure supply unit 55 includes a primary regulator valve 56 and a secondary regulator valve 57. The primary regulator valve 56 includes a linear solenoid for supplying the engaging pressure. The linear solenoid outputs a current value determined by a duty signal (duty value) transmitted from the ECU 18. The primary regulator valve 56 regulates the hydraulic pressure supplied from the oil pump 51, into a line pressure PL used as hydraulic oil, based on the current value. The secondary regulator valve 57, which is disposed on the drain side of the primary regulator valve 56, regulates the line pressure PL into a lubricating oil pressure that is lower than the line pressure PL. The secondary regulator valve 57 includes a linear solenoid.

The first linear solenoid valve SL1 receives the line pressure PL, and generates an engaging pressure into which the line pressure PL is regulated based on a supply signal transmitted from the ECU 18. The engaging pressure generated in the first linear solenoid valve SL1 is supplied to the first hydraulic servo 58 corresponding to the first clutch C1. Similarly, the second linear solenoid valve SL2 supplies a regulated engaging pressure to the second hydraulic servo 59 corresponding to the second clutch C2, and the third linear solenoid valve SL3 supplies a regulated engaging pressure to the third hydraulic servo 60 corresponding to the third clutch C3, while the fourth linear solenoid valve SL4 supplies a regulated engaging pressure to the fourth hydraulic servo 61 corresponding to the fourth clutch C4. Similarly, the fifth linear solenoid valve SL5 supplies a regulated engaging pressure to the fifth hydraulic servo 62 corresponding to the first brake B1, and the sixth linear solenoid valve SL6 supplies a regulated engaging pressure to the sixth hydraulic servo 63 corresponding to the second brake B2.

Each of the hydraulic servos 58, 59, 60, 61, 62 and 63 includes a piston (not shown) that presses a plurality of engaging elements (not shown) disposed inside the corresponding frictional engagement mechanism. The supply signal is a current value determined by the duty ratio of pulses transmitted to each of the first linear solenoid valve SL1 to the sixth linear solenoid valve SL6. The ECU 18 controls the torque capacity of each frictional engagement mechanism, by adjusting the engaging pressure applied to the piston according to the current value. Namely, the engaging pressures into which the line pressure PL is regulated by the first linear solenoid valve SL1 to the sixth linear solenoid valve SL6 are supplied to the respective frictional engagement mechanisms, such that each of the frictional engagement mechanisms is controlled to a selected one of a fully engaged state, released state, and a slipping state between the fully engaged state and the released state. As the frictional engagement mechanism, a dry single-disc clutch may be used, in place of a wet multiple-disc clutch. In this case, the torque capacity can be controlled by controlling an actuator that changes the clutch stroke.

In the following, the second brake B2 will be described as one example of frictional engagement mechanism. When the gear position of the transmission 20 is set to the forward 1st-speed (1ST) position, for example, the supply signal is generated to the sixth linear solenoid valve SL6 corresponding to the second brake B2. The sixth linear solenoid valve SL6, which is one example of engaging pressure generator, generates an engaging pressure into which the line pressure PL is regulated in response to the supply signal. The engaging pressure thus generated is supplied to a first valve 64 and a second valve 65. The first valve 64 also receives engaging pressures generated by the other valves, i.e., the second linear solenoid valve SL2 through the fifth linear solenoid valve SL5. When any of the forward 2nd-speed (2ND) position to the forward 8th-speed (8TH) position is established, namely, when the second brake B2 is changed to the released state, at least one of the second linear solenoid valve SL2 to the fifth linear solenoid valve SL5 generates engaging pressure.

The first valve 64 is provided in an oil passage 66 through which the engaging pressure generated in the sixth linear solenoid valve SL6 is supplied to the second brake B2. The first valve 64 performs opening operation to open the oil passage 66 when the second brake B2 is engaged, and performs closing operation to shut off or block the oil passage 66 when the second brake B2 is released. The lubricating oil is supplied to the second valve 65 after a lubricating oil pressure is generated in the secondary regulator valve 57. The second valve 65 is located in a lubricating oil passage 67 through which the lubricating oil is supplied to the second brake B2, and also communicates with the sixth linear solenoid valve SL6 such that the engaging pressure can be supplied to the second valve 65. The second valve 65 is opened under the engaging pressure so as to open the lubricating oil passage 67 when the sixth linear solenoid valve SL6 generates the engaging pressure, and is closed so as to close the lubricating oil passage 67 when no engaging pressure is generated by the sixth linear solenoid valve SL6. Thus, the second valve 65 serves as a lubricating oil switching valve. The seventh solenoid valve SL7 is an opening/closing valve that opens and closes an oil passage through which the line pressure PL is supplied to the first valve 64, under control of the ECU 18, when the reverse 1st-speed gear position is established.

Figure 5:
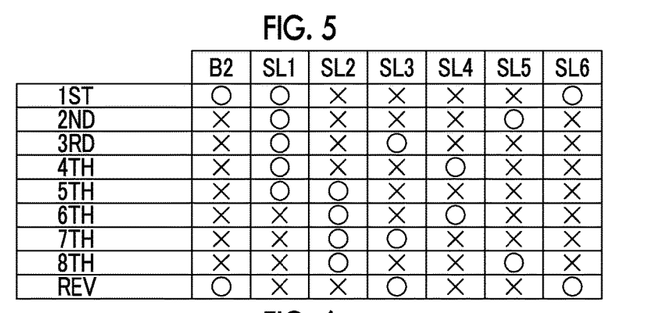
FIG. 5 is a view showing the relationship between the gear positions and generation of the engaging pressure.

FIG. 5 is a view showing the relationship between the gear positions and generation of engaging pressure. In FIG. 5, in a column "B2" representing the second brake B2, "O" indicates the engaged state, and "x" indicates the released state. Also, in each column of SL1-SL6 representing the first linear solenoid valve SL1 to the sixth linear solenoid valve SL6, respectively, "O" indicates generation of the engaging pressure, and "x" indicates stop of generation of the engaging pressure. According to this table, the second brake B2 is changed to the engaged state when the forward 1st-speed (1ST) position and the reverse 1st-speed (REV) position are established. Namely, when the forward 1st-speed position is set, the first linear solenoid valve SL1 and the sixth linear solenoid valve SL6 generate engaging pressures. When the reverse 1st-speed position is set, the third linear solenoid valve SL3 and the sixth linear solenoid valve SL6 generate engaging pressures.

Figure 6:
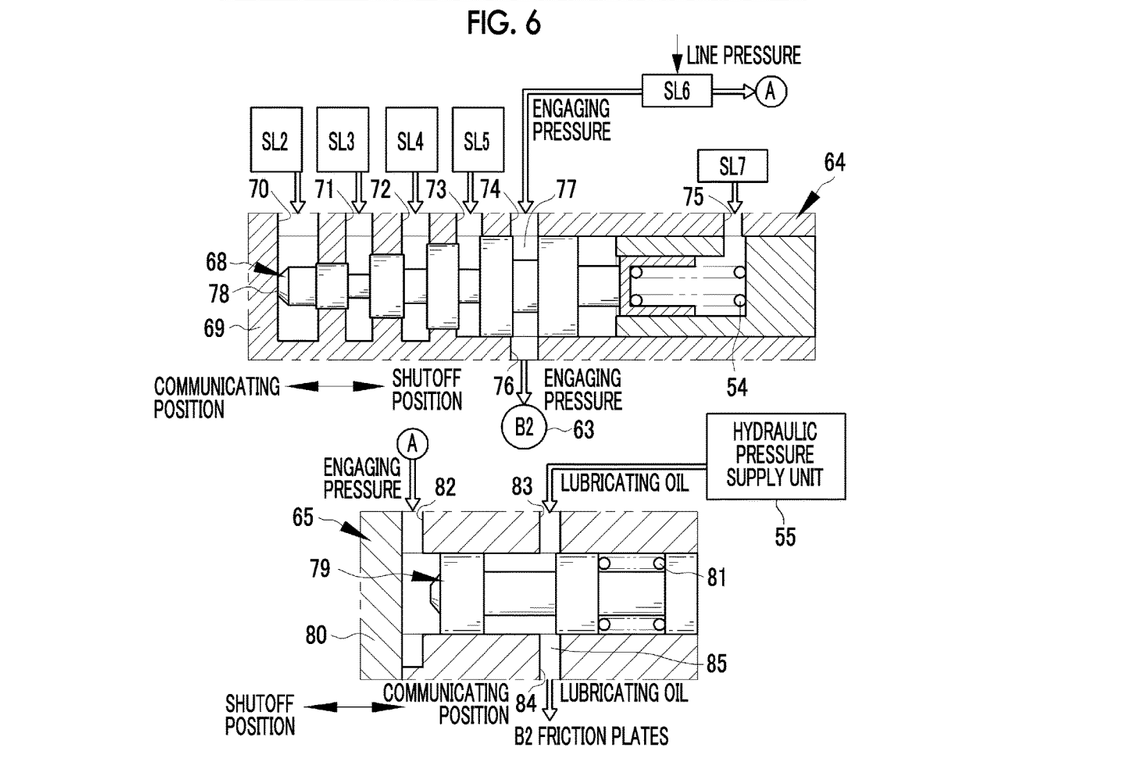
FIG. 6 is an explanatory view showing principal parts of a first valve and a second valve.

FIG. 6 is an explanatory view showing principal parts of the first valve 64 and the second valve 65. As shown in FIG. 6, the first valve 64 includes a first spool 68, a first sleeve 69, and a first biasing member 54. The first sleeve 69 includes a first input first port 70 through a first input sixth port 75, and a first output port 76. The engaging pressure generated by the second linear solenoid valve SL2 is supplied to the first input first port 70, and the engaging pressure generated by the third linear solenoid valve SL3 is supplied to the first input second port 71, while the engaging pressure generated by the fourth linear solenoid valve SL4 is supplied to the first input third port 72. The engaging pressure generated by the fifth linear solenoid valve SL5 is supplied to the first input fourth port 73, and the engaging pressure generated by the sixth linear solenoid valve SL6 is supplied to the first input fifth port 74, while the line pressure PL generated by the seventh solenoid valve SL7 is supplied to the first input sixth port 75. The first output port 76 delivers the engaging pressure generated by the sixth linear solenoid valve SL6. The first spool 68 is movable between a communicating position in which the first input fifth port 74 and the first output port 76 communicate with each other via a first passage 77, and a shutoff position in which the first passage 77 is shut off or blocked. The first biasing member 54 biases the first spool 68 toward the communicating position. The engaging pressure supplied to the first input first port 70 to the first input fourth port 73 biases the first spool 68 toward the shutoff position, against the bias force of the first biasing member 54. The line pressure PL supplied to the first input sixth port 75 pressurizes the first spool 68 in the biasing direction of the first biasing member 54, and moves the first spool 68 to the communicating position.

The first valve 64 shown in FIG. 6 is in an open state in which the first spool 68 is in the communicating position. In this state, the second brake B2 is in the engaged state, and no engaging pressure is supplied to any of the first input first port 70 through the first input fourth port 73. Accordingly, a distal end 78 of the first spool 68 as viewed in the biasing direction of the first biasing member 54 abuts on the first sleeve 69 so that the first spool 68 is held in the communicating position. When the forward first-speed gear position is established, for example, the second brake B2 is engaged. Therefore, the first valve 64 is placed in the open state in which no engaging pressure is supplied to any of the first input first port 70 through the first input fourth port 73. The first valve 64, when placed in the open state, supplies the engaging pressure supplied to the first input fifth port 74 to the hydraulic servo 63 of the second brake B2.

When an engaging pressure is supplied to any of the first input first port 70 through the first input fourth port 73 of the first valve 64, the first spool 68 moves to the shutoff position against the bias force of the first biasing member 54, no matter whether an engaging pressure is supplied to the first input fifth port 74. With the first spool 68 thus moved to the shutoff position, the first valve 64 is placed in the closed state in which the first spool 68 shuts off or blocks the first passage 77 between the first input fifth port 74 and the first output port 76.

With the first valve 64 thus provided, even if the engaging pressure generated by the sixth linear solenoid valve SL6 rises, for example, while a gear position in which the second brake B2 is set to the released state is established, the first spool 68 is in the closed state in which the first input fifth port 74 is blocked; therefore, the second brake B2 can be prevented from being undesirably changed into the engaged state. The engaging pressure supplied to the first input first port 70 to the first input fourth port 73 is one example of a signal pressure generated when the second brake B2 is placed in the released state.

In the meantime, when the reverse 1st-speed gear position is established, the third clutch C3 as well as the second brake B2 is engaged, as described above with reference to FIG. 5. In order to engage the third clutch C3, the engaging pressure generated by the third linear solenoid valve SL3 is supplied to the first valve 64 shown in FIG. 6. Therefore, in the first valve 64, the first spool 68 moves to the shutoff position, and supply of the engaging pressure to the second brake is interrupted. Thus, when the reverse 1st-speed gear position is established, the ECU 18 operates the seventh solenoid valve SL7 so as to supply the line pressure PL to the first input sixth port 75. If the line pressure PL is supplied to the first input sixth port 75, the pressing force produced by the line pressure PL is applied to the first spool 68 in the biasing direction of the first biasing member 54, and the first spool 68 moves from the shutoff position to the communicating position. As a result, the first valve 64 is placed in the open state, and can supply the engaging pressure to the hydraulic servo 63 of the second brake B2, when the reverse 1st-speed gear position is established.

The second valve 65 includes a second spool 79, a second sleeve 80, and a second biasing member 81. The second sleeve 80 includes a second input first port 82, a second input second port 83, and a second output port 84. The engaging pressure generated by the sixth linear solenoid valve SL6 is supplied to the second input first port 82, and the lubricating oil generated by the hydraulic pressure supply unit 55 is supplied to the second input second port 83. The second spool 79 is movable between a communicating position in which the second input second port 83 and the second output port 84 communicate with each other via a second passage 85, and a shutoff position in which the second passage 85 is shut off or blocked.

The second valve 65 shown in FIG. 6 is in the open state in which the second spool 79 is in the communicating position. In this state, the engaging pressure is supplied to the second input first port 82. Accordingly, the second spool 79 is held in the communicating position in which the second spool 79 is pressed to the right against the bias force of the second biasing member 81, under the hydraulic engaging pressure supplied to the second input first port 82. Then, when supply of the engaging pressure to the second input first port 82 is stopped, the second spool 79 moves to the left, to the shutoff position, under the bias force of the second biasing member 81. Namely, when the second brake B2 is in the released state, the second valve 65 is placed in the closed state in which no lubricating oil is supplied to the second brake B2. However, since the first valve 64 is in the closed state when the second brake B2 is in the released state, the second brake B2 is not changed into the engaged state even if the engaging pressure is generated in the sixth linear solenoid valve SL6. Therefore, in this embodiment, even when the second brake B2 is changed into the released state (including the slipping state), it is possible to generate the engaging pressure in the sixth linear solenoid valve SL6, and supply the lubricating oil to the second brake B2.

Figure 7:
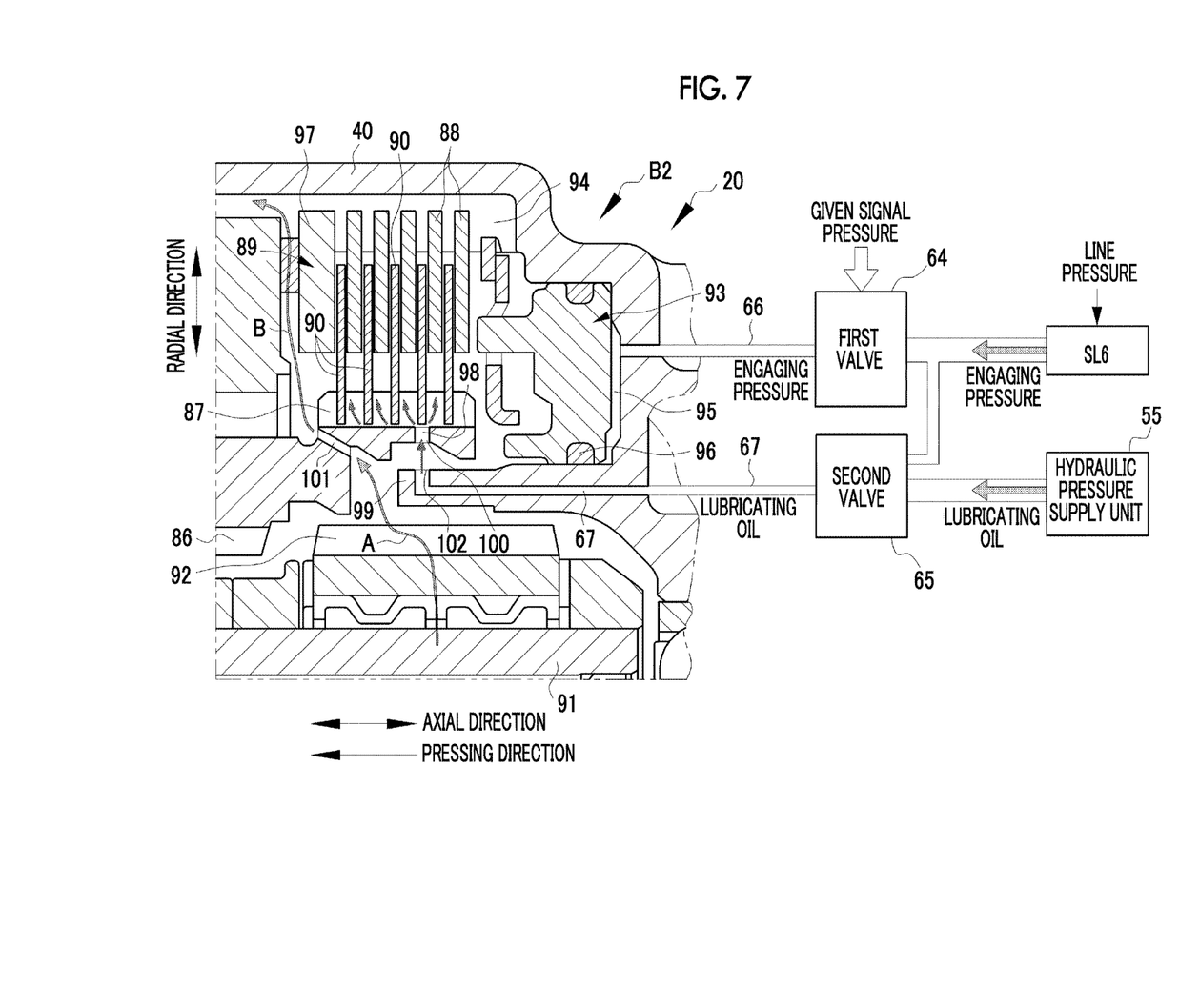
FIG. 7 is a cross-sectional view showing a principal part of a second brake, as a part of the transmission.

FIG. 7 is a cross-sectional view showing a principal part of the second brake B2. As shown in FIG. 7, the case 40 is fixed to the vehicle 10, and constituent parts of the transmission 20 are watertightly housed in the case 40. The second brake B2 includes an annular hub 87, a plurality of first friction plates 88, drum 89, and a plurality of second friction plates 90. The first friction plates 88 are mounted on a radially outer portion of the hub 87. The drum 89 is a cylindrical body that is disposed concentrically with the hub 87, on the radially outer side of the hub 87, and is fixed to the inner wall of the case 40. The second friction plates 90 are mounted on a radially inner portion of the drum 89, and are arranged alternately with the first friction plates 88. A Ravigneaux ring gear 86 is formed on the inner side of the hub 87. A pinion gear 92 attached to a carrier 91 is disposed on the radially inner side of the hub 87.

The first friction plates 88 and the second friction plates 90 are housed in a housing chamber 94 defined by the case 40, hub 87, and a piston 93. The housing chamber 94 is annually formed in the case 40. The piston 93 is disposed in a recessed portion 95 formed at an inside right wall of the case 40 such that it is movable in the axial direction. Oil seals 96 are attached to the piston 93, so as to form watertight space between the piston 93 and the recessed portion 95. The recessed portion 95 functions as an oil chamber in which pressing force is generated and applied to the piston 93. The piston 93 causes the first friction plates 88 and the second friction plates 90 to engage with each other by use of the pressing force. On one side of the first friction plates 88 and the second friction plates 90, opposite to the piston 93, a flange 97 that provides a part of the drum 89 is located. The flange 97 serves to receive the pressing force of the piston 93. When the engaging pressure is supplied from the first valve 64 to the recessed portion 95, the piston 93 moves in the pressing direction, so that the first friction plates 88 and the second friction plates 90 are sandwiched under pressure between the piston 93 and the flange 97, and the second brake B2 is placed in the engaged state. Although not illustrated in the drawings, the piston 93 is biased by a return spring (not shown), in a direction opposite to the pressing direction. The first friction plates 88 and the second friction plates 90 are one example of engaging elements that transmit torque by use of frictional force. Also, the recessed portion 95, piston 93, return spring, etc. are one example of hydraulic parts.

The hub 87 is formed with a lubricating oil supply passage 98 that extends through the hub 87 in a radial direction. The lubricating oil supply passage 98 is in the form of a through-hole through which the lubricating oil is supplied toward the first friction plates 88 and the second friction plates 90. The case 40 is formed with a partition wall portion 99 that protrudes from the lower side of the recessed portion 95 toward the lower side of the hub 87, as viewed in cross section. The partition wall portion 99 is formed in an annular shape, so as to cover a lower-side opening 100 of the lubricating oil supply passage 98 on the radially inner side of the hub 87. The partition wall portion 99 guides redundant lubricating oil fed from the pinion gear 92, for example, to the vicinity of the piston 93, in a direction of arrow A shown in FIG. 7, for example. The hub 87 or a member integral with the hub 87 is formed with a discharge hole 101 that guides lubrication oil that soars from the radially inner side of the partition wall portion 99, to a location on the radially outer side of the integral member, which is apart from the engaging elements including the first friction plates 88 and the second friction plates 90. The redundant lubricant is guided to the location apart from the engaging elements, through the discharge hole 101, in a direction of arrow B shown in FIG. 7. A supply port 102 that is open toward the lubricating oil supply passage 98 is formed in the outer circumferential surface of the partition wall portion 99. The lubricating oil passage 67 that extends through the partition wall portion 99 is connected to the supply port 102.

Figure 8:
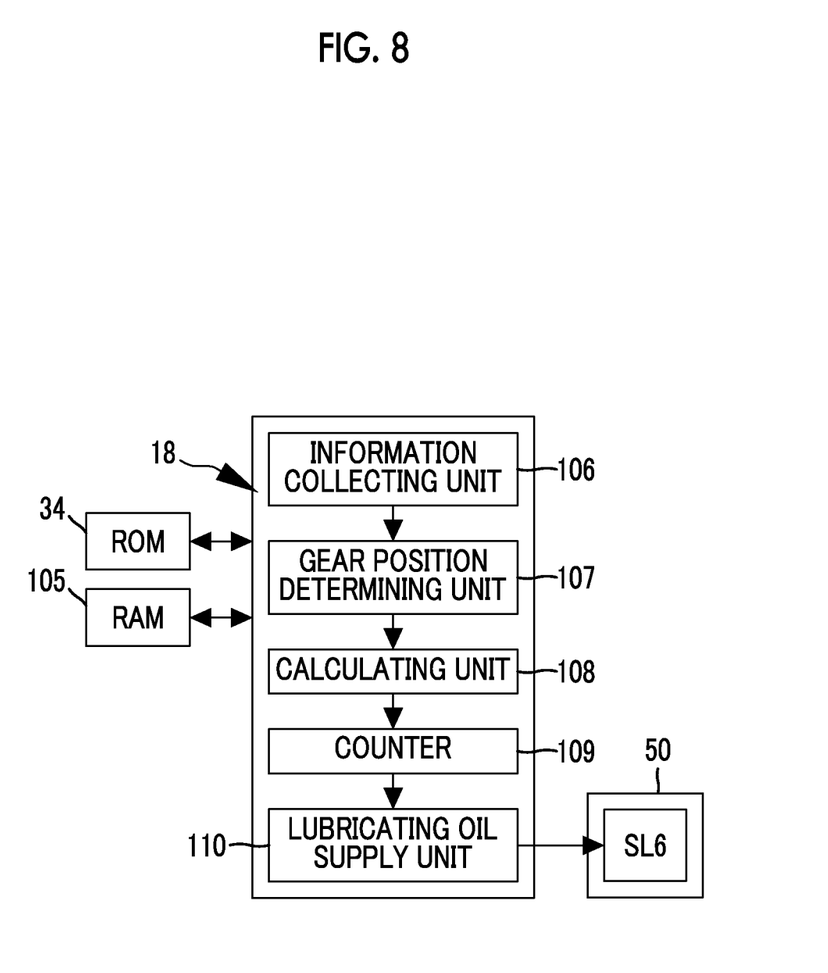
FIG. 8 is an explanatory view showing a principal part of an ECU.

FIG. 8 is an explanatory view showing a principal part of the ECU 18. The ECU 18 performs arithmetic processing based on various control programs and maps stored in the ROM 34. RAM 105 is a memory that temporarily stores computation results obtained in the ECU 18, data received from each sensor, and so forth. The ECU 18 operates based on the control programs stored in the ROM 34, so as to function as an information collecting unit 106, gear position determining unit 107, calculating unit 108, counter 109, and a lubricating oil supply unit 110, for example.

The information collecting unit 106 sequentially collects each information of the vehicle 10. The gear position determining unit 107 computes the vehicle speed based on an output signal of the output shaft speed sensor 33, for example, and calculates the throttle opening based on an output signal of the throttle opening sensor 30. Then, the gear position determining unit 107 selects a target gear position with reference to a shift map stored in the ROM 34, for example, based on the computed vehicle speed, and the throttle opening, and determines whether shifting is needed, by comparing the selected target gear position with the current gear position. The calculating unit 108 calculates the quantity of heat generated by the second friction plates 90, for example, when it is determined that shifting is needed, and the second brake B2 is changed from the engaged state to the released state. For example, the quantity of heat generated by the second friction plates 90 is calculated, based on the amount of rotation or torque change of the Ravigneaux ring gear 86, or a hydraulic pressure corresponding to the engaging pressure supplied to the sixth linear solenoid valve SL6. The calculating unit 108 calculates the temperature of the second friction plates 90, for example, based on the calculated quantity of heat, and calculates a cooling time for cooling the second friction plates 90, for example, based on the calculated temperature. The cooling time corresponds to a length of time for which the lubricating oil is supplied. The counter 109 starts measuring the cooling time immediately after the second brake B2 is changed from the engaged state to the released state. In this connection, a point in time immediately after the second brake B2 is changed from the engaged state to the released state may be a point in time at which the rotating element released by the second brake B2 starts rotating, or a point in time at which the rotation of the rotating element reaches a predetermined rotational speed, or a point in time after a lapse of a given time from the time when a signal for causing the sixth linear solenoid valve SL6 to generate the engaging pressure is generated. During the cooling time, the ECU 18 controls generation of the engaging pressure so that the lubricating oil is supplied, namely, the quantity of heat generated by the second friction plates 90 becomes equal to or smaller than a predetermined threshold value. The quantity of heat generated and the temperature may be calculated with respect to the first friction plates, in place of the second friction plates 90.

When the second brake B2 is changed to the released state, for example, the lubricating oil supply unit 110 controls the hydraulic circuit 50 so that the engaging pressure is generated in the sixth linear solenoid valve SL6. As a result, the second valve 65 is placed in the open state, and the lubricating oil is supplied to the second brake B2. At this time, the engaging pressure is supplied to any of the first input first port 70 to the first input fourth port 73, so that the first valve 64 is placed in the closed state. Thus, the engaging pressure generated in the sixth linear solenoid valve SL6 is not supplied to the second brake B2. The information collecting unit 106, gear position determining unit 107, calculating unit 108, counter 109, and the lubricating oil supply unit 110 are one example of electronic control units for controlling opening and closing of the second valve 65.

Figure 9:
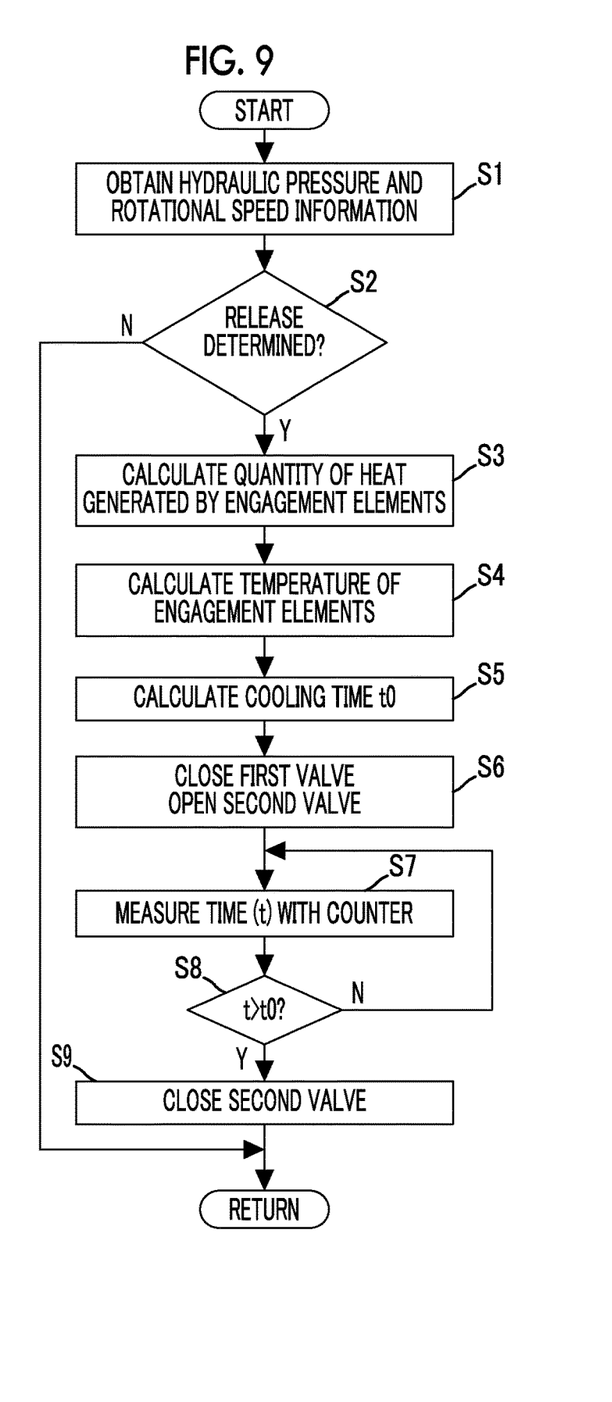
FIG. 9 is a flowchart illustrating the operating procedure of releasing the second brake.

FIG. 9 is a flowchart illustrating the operation procedure for releasing the second brake B2. As shown in FIG. 9, in step S1, the information collecting unit 106 sequentially collects information on engaging pressure and lubricating oil which the hydraulic circuit 50 supplies to each part, e.g., information of the temperature and the hydraulic pressure, information of the rotational speeds of the engine 11 and each rotating element of the automatic transmission 12, and each information of the vehicle 10. In step S2, the gear position determining unit 107 determines whether a shift request is made so as to shift the transmission by changing the second brake B2 from the engaged state to the released state. If an affirmative decision (YES) is obtained in step S2, namely, if the shift request involves changing of the second brake B2 from the engaged state to the released state, the control proceeds to step S3. In step S3, the calculating unit 108 calculates the quantity of heat generated by the second friction plates 90, for example, based on the amount of rotation or torque change of the Ravigneaux ring gear 86, or the hydraulic engaging pressure applied to the piston 93, for example, which is obtained at that time. In step S4, the calculating unit 108 calculates the temperature of the second friction plates 90, for example, based on the quantity of heat generated, which was previously calculated. The temperature may be calculated or estimated from the quantity of heat generated, using parameters including the temperature of the lubricating oil, the status of usage of the second brake B2 up to the present, and the atmospheric temperature, for example.

In step S5, the calculating unit 108 calculates the time of supply of the lubricating oil, namely, the cooling time (t0) for which the engaging elements are cooled by the lubricating oil, based on the calculated temperature. In this case, the cooling time (t0) may be obtained, based on a pre-stored map of the correspondence relationship between the temperature of the second friction plates 90 and the cooling time of cooling with the lubricating oil, for example.

In the following description, it is assumed that the transmission 20 is shifted from the forward 1st-speed gear position to the forward 2nd-speed gear position. In step S6, when the second brake B2 is switched from the engaged state to the released state, the ECU 18 outputs a command to the hydraulic circuit 50 so as to supply the lubricating oil to the second brake B2 according to the cooling time t0.

More specifically, in the above case of shifting, namely, in the case where the forward 2-speed (2ND) gear position is formed as described above in FIG. 3, the ECU 18 sends a command to control the hydraulic circuit 50, so as to release the second brake B2, and engage the first brake B1. As a result, the hydraulic circuit 50 causes the first linear solenoid valve SL1 and the fifth linear solenoid valve SL5 to generate the engaging pressures, so as to bring the first brake B1 into the engaged state.

Since the engaging pressure generated in the fifth linear solenoid valve SL5 is supplied to the first input fourth port 73 of the first valve 64, the first spool 68 is placed in the shutoff position, and the first valve 64 is placed in the closed state in which supply of the engaging pressure to the sixth hydraulic servo 63 of the second brake B2 is stopped. At this time, the lubricating oil supply unit 110 causes the sixth linear solenoid valve SL6 to generate an engaging pressure, so that the second valve 65 is placed in the open state. The second valve 65 opens the lubricating oil passage 67 when it is placed in the open state. Thus, the lubricating oil is supplied to the second brake B2.

In step S7, the ECU 18 measures time with the counter 109, with reference to a point in time at which the command is generated in step S6, or a point in time after a lapse of a given time from that point, for example. In step S8, the ECU 18 determines whether a count value (t) measured with the counter 109 exceeds the cooling time (t0). If an affirmative decision (YES) is obtained in step S8, the control proceeds to step S9. In step S9, the lubricating oil supply unit 110 stops generation of the engaging pressure in the sixth linear solenoid valve SL6. If generation of the engaging pressure in the sixth linear solenoid valve SL6 is stopped, the second spool 79 is changed to the shutoff position, and the second valve 65 is placed in the closed state in which the lubricating oil passage 67 is closed. If a negative decision (NO) is obtained in step S2, the control returns. If a negative decision (NO) is obtained in step S8, time continues to be measured in step S7. A temperature sensor may be provided for directly or indirectly detecting the temperature of the second friction plates 90. In this case, calculation of the quantity of heat generated as explained in step S3, and calculation of the temperature as explained in step S4, may be omitted.

Figure 10:
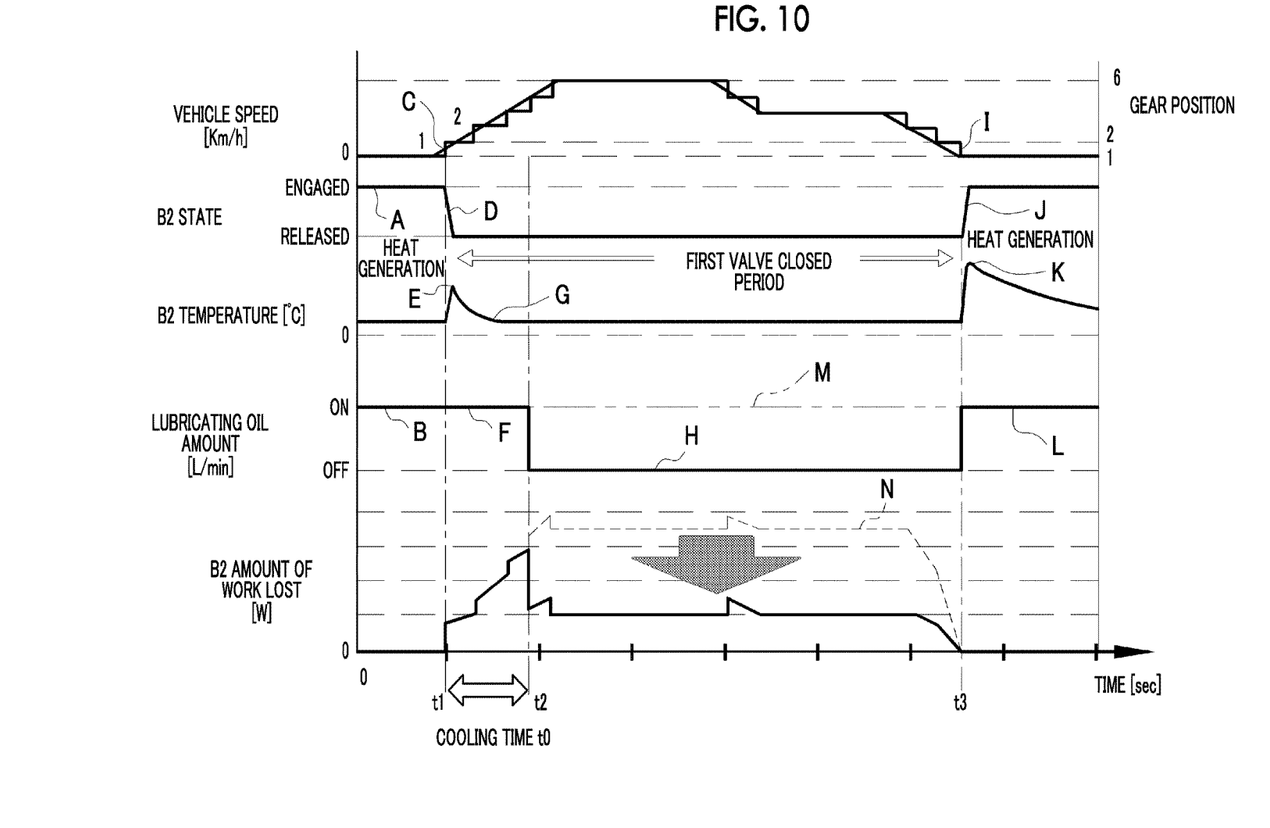
FIG. 10 is a time chart showing operation of each part when releasing the second brake.

FIG. 10 is a time chart showing operation of each part when the second brake B2 is released and engaged. "B2" shown in FIG. 10 represents the second brake B2 as one of the frictional engagement mechanisms. The vehicle travels in the first-speed gear position until time t1. In this case, the first linear solenoid valve SL1 and the sixth linear solenoid valve SL6 are in engaged states. When the sixth linear solenoid valve SL6 is in the engaged state, the first valve 64 and the second valve 65 are in the open states. Therefore, the engaging pressure is supplied to the sixth hydraulic servo 63 such that the second brake B2 is placed in the engaged state (symbol A), and the lubricating oil is supplied to the second brake B2 (symbol B).

In this case, even if the lubricating is supplied when the second brake B2 is in the engaged state, there is no problem since the first friction plates 88 and the second friction plates 90 are completely fixed to the case 40. In the case of a clutch, the first friction plates 88 and the second friction plates 90 are in fully engaged states, and rotate integrally or as a unit; therefore, no slip occurs even if the lubricating oil enters clearances between the first friction plates 88 and the second friction plates 90.

At time t1, the transmission 20 is shifted up from the 1st-speed gear position to the 2nd-speed gear position (symbol C). In this case, the ECU 18 performs release-side control for changing the second brake B2 from the engaged state to the released state (symbol D). With the release-side control thus performed, the second brake B2 is brought into a slipping state in the process of changing toward the release state. If the slipping state appears, the actual temperature of the second friction plates 90, for example, becomes higher than that at the time when the second brake B2 is in the engaged state (symbol E). The ECU 18 estimates the temperature of the second friction plates 90, for example, based on the current operating conditions, such as the rotational speed and torque of the second friction plates 90, and obtains the cooling time "t0" based on the estimated temperature. Then, the ECU 18 measures the cooling time "t0" with reference to time t1. At this time, the second valve 65 is in the open state in which the lubricating oil is supplied to the second brake B2 (symbol B). Thus, the lubricating oil supply unit 110 continues supply of the lubricating oil to the second brake B2, for a length of time corresponding to the cooling time "t0" (symbol F). Accordingly, heat generated by the second brake B2 is cooled by the lubricating oil (symbol G) while the second brake B2 is changing from the engaged state to the released state (while it is slipping).

At time t2, the counter 109 finishes its measurement of the cooling time "t0". At this time, the lubricating oil supply unit 110 finishes generation of the engaging pressure in the sixth linear solenoid valve SL6, and stops supply of the lubricating oil to the second brake B2 (symbol H). The second friction plates 90 of the second brake B2 are cooled by the lubricating oil thus supplied until immediately before time t2. Therefore, the length of time for which the second brake B2 is naturally cooled can be significantly shortened.

At time t3, the transmission 20 is shifted down from the 2nd-speed gear position to the 1st-speed gear position (symbol I). At this time, apply-side control (symbol J) for changing the second brake B2 from the released state to the engaged state is performed. At this time, a slipping state appears, and heat is generated in the second brake B2 (symbol K).

The ECU 18 performs the apply-side control at time t3. As a result, the engaging pressure is generated in the sixth linear solenoid valve SL6. The engaging pressure generated by the sixth linear solenoid valve SL6 is supplied to the first valve 64 and the second valve 65. The first valve 64, when supplied with the engaging pressure generated by the sixth linear solenoid valve SL6, supplies the engaging pressure to the hydraulic servo 63 of the second brake B2. Also, the second valve 65, when supplied with the engaging pressure generated by the sixth linear solenoid valve SL6, is placed in the open state, and supplies the lubricating oil to the second brake B2 (symbol L). Thus, heat generated in the second brake B2 can be promptly cooled.

In the case of this embodiment, when the second brake B2 is in the released state, supply of the lubricating oil to the second brake B2 is stopped, as indicated by symbol H. Therefore, as compared with an example (symbol M indicated by a two-dot chain line) in which the lubricating oil is supplied to the second brake B2 at all times, the amount of work lost (symbol N indicated by a dotted line) due to resistance the rotating second friction plates 90 receives from the lubricating oil can be significantly reduced.

While the disclosure has been described based on the embodiment, this disclosure is not limited to the above-described embodiment, but may be embodied with various changes added thereto without departing from its principle. In the illustrated embodiment, the second valve 65 is directly connected to the sixth linear solenoid valve SL6 as one example of engaging pressure generator, and the engaging pressure is supplied from the sixth linear solenoid valve SL6 to the second brake B2, so that the lubricating oil is supplied to the second brake B2 as one example of frictional engagement mechanism. However, this disclosure is not limited to this arrangement, but a pressure regulating valve may be connected between the sixth linear solenoid valve SL6 and the second valve 65, for example, and a modulated pressure obtained by regulating (reducing or increasing) the engaging pressure with the pressure regulating valve may be used as a command pressure for the second valve 65.

In the illustrated embodiment, the engaging pressure generated by at least one of the second linear solenoid valve SL2 to the fifth linear solenoid valve SL5 is used as a signal pressure for controlling opening and closing of the first valve 64. However, opening and closing of the first valve 64 may be controlled according to a signal received from the ECU 18. Also, the line pressure PL applied to each of the second linear solenoid valve SL2 to the fifth linear solenoid valve SL5 may be used, in place of the engaging pressure generated by at least one of the second linear solenoid valve SL2 to the fifth linear solenoid valve SL5. In this case, a switching valve is provided for each of the second linear solenoid valve SL2 to the fifth linear solenoid valve SL5.

Figure 11:
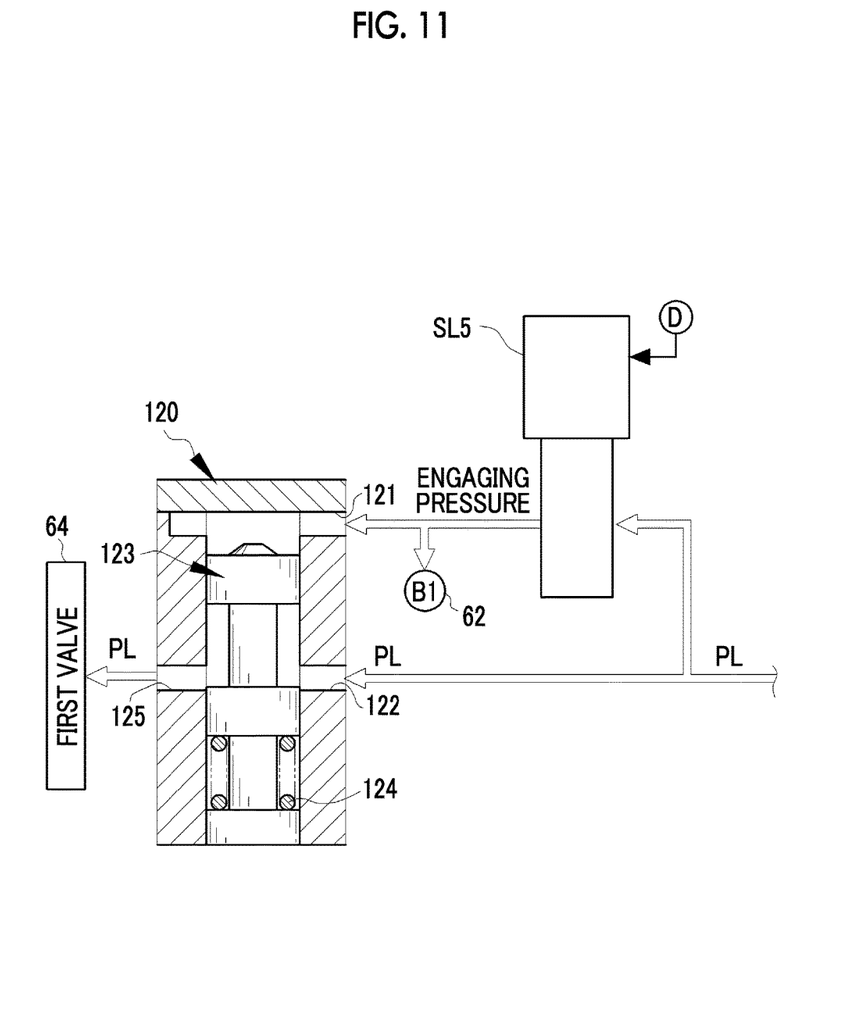
FIG. 11 is an explanatory view showing another example of controlling opening and closing of the first valve, using a line pressure.

FIG. 11 shows one example in which the line pressure PL is used, as a signal pressure for controlling opening and closing of the first valve 64. As shown in FIG. 11, an opening/closing valve 120 is connected between the fifth linear solenoid valve SL5 and the first valve 64. The opening/closing valve 120 includes a first input port 121 that receives the engaging pressure generated by the fifth linear solenoid valve SL5, a second input port 122 that receives the line pressure PL, and an output port 125. The opening/closing valve 120 opens when a spool 123 moves to a communicating position against the bias force of a biasing member 124, in response to input of the engaging pressure generated by the fifth linear solenoid valve SL5, so that the line pressure PL is supplied from the output port 125 to the first valve 64. Thus, as a signal transmitted to the first valve 64 for preventing erroneous engagement of the second brake B2, the line pressure PL applied to the fifth linear solenoid valve SL5 may be used, in place of the engaging pressure regulated by the fifth linear solenoid valve SL5. In the example shown in FIG. 11, the second linear solenoid valve SL2 through the fourth linear solenoid valve SL4 have the same or similar configuration as that explained with reference to FIG. 11.

The frictional engagement mechanism of this disclosure is not limited to the second brake B2, but any of the first clutch C1 through the fourth clutch C4 and the first brake B1 as described above may be used. Also, the number of frictional engagement mechanisms to which this disclosure is applied is not limited.

What is claimed is:

1. A lubricating system for supplying a lubricating oil to a frictional engagement mechanism,
the frictional engagement mechanism including
engaging elements configured to transmit torque by use of frictional force, and
a hydraulic part configured to press the engaging elements and generate the frictional force,
the lubricating system comprising:
an engaging pressure generator configured to generate an engaging pressure supplied to the hydraulic part;
a first valve configured to interrupt supply of the engaging pressure to the hydraulic part when the frictional engagement mechanism is placed in a released state; and
a second valve configured to operate in response to the engaging pressure, and supply the lubricating oil to the engaging elements when the frictional engagement mechanism is placed in the released state.

2. The lubricating system according to claim 1, wherein:
the first valve is configured such that interruption of supply of the engaging pressure to the hydraulic part is cancelled when the frictional engagement mechanism is placed in an engaged state; and
the second valve is configured such that the lubricating oil is supplied to the engaging elements when the frictional engagement mechanism is placed in the engaged state.

3. The lubricating system according to claim 1, further comprising
a lubricating oil passage through which the lubricating oil is supplied to the engaging elements, wherein
the second valve is configured to open the lubricating oil passage when the engaging pressure generated by the engaging pressure generator is supplied to the second valve.

4. The lubricating system according to claim 1, further comprising
an electronic control unit configured to control opening and closing operation of the second valve, wherein
the electronic control unit is configured to operate the second valve such that the lubricating oil is supplied to the engaging elements, during a predetermined time after the frictional engagement mechanism is switched from an engaged state to the released state.

5. The lubricating system according to claim 4, wherein
the predetermined time is a length of time required to make a quantity of heat generation equal to or smaller than a predetermined value, the quantity of heat generation being estimated based on the engaging pressure supplied to the hydraulic part of the frictional engagement mechanism and a rotational speed of the engaging elements.

6. The lubricating system according to claim 1, further comprising
an oil passage through which the engaging pressure is supplied from the engaging pressure generator to the hydraulic part, wherein
the first valve is configured to:
shut off the oil passage by operating according to a given signal pressure generated when the frictional engagement mechanism is placed in the released state; and
open the oil passage when the given signal pressure is not generated.

\* \* \* \* \*